C. CAIN.
ANIMAL TRAP.
APPLICATION FILED MAR. 31, 1921.
1,418,864.
Patented June 6, 1922.
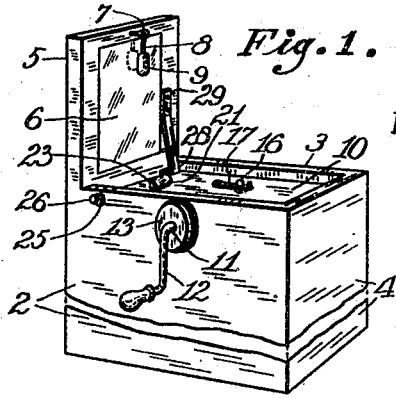
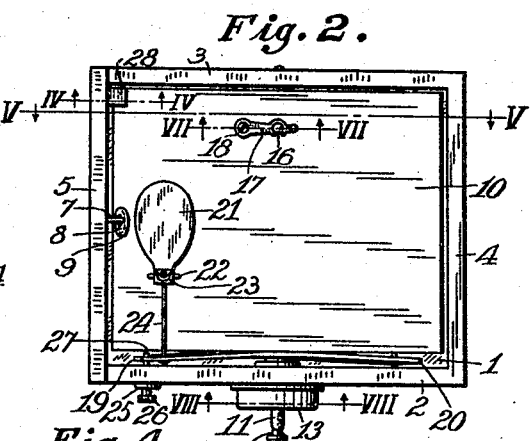
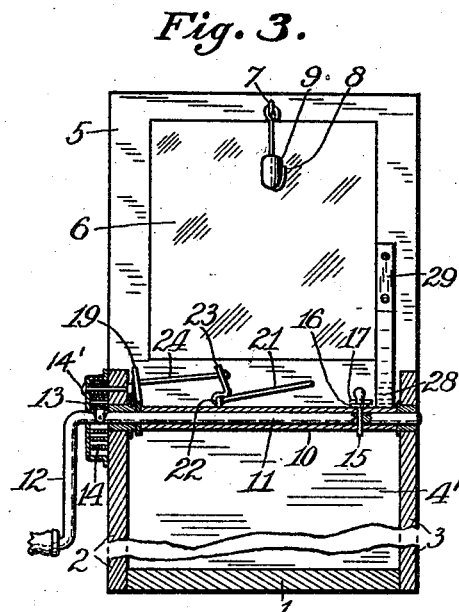
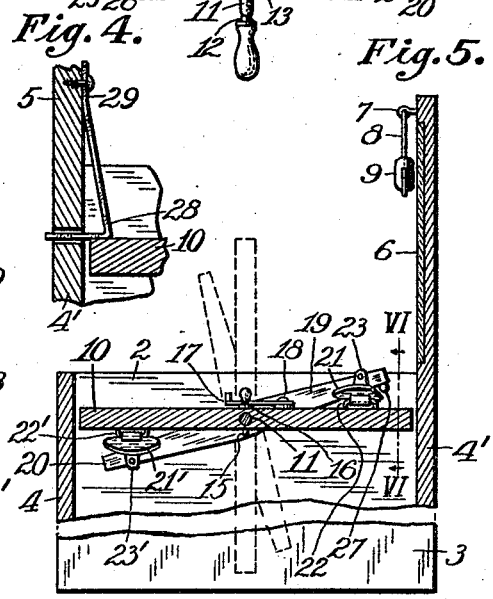
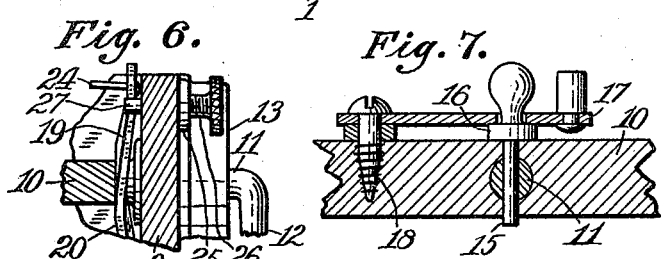
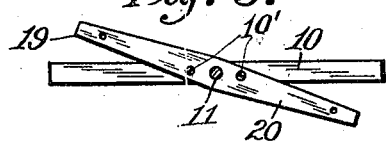
Inventor:
Charles Cain,
By E. T. Silvius,
Attorney.

UNITED STATES PATENT OFFICE.

CHARLES CAIN, OF WASHINGTON TOWNSHIP, OWEN COUNTY, INDIANA.

ANIMAL TRAP.

1,418,864.      Specification of Letters Patent.      Patented June 6, 1922.

Application filed March 31, 1921. Serial No. 457,462.

*To all whom it may concern:*

Be it known that I, CHARLES CAIN, a citizen of the United States, residing in Washington Township, in the county of Owen and State of Indiana, have invented a new and useful Animal Trap, of which the following is a specification, reference being had to the accompanying drawings and to the letters and figures of reference marked thereon.

This invention relates to an automatic repeating live-animal trap designed for trapping, without injury, a plurality of animals in succession.

An object of this invention is to provide a cheap, durable, reliable and economical repeating-action live-animal trap. Another object is to provide a trap, requiring the minimum amount of attention, for securing a plurality of animals. A further object is to provide an improved trap which shall operate without injury to a valuable fur-bearing animal or its fur, thus safeguarding the pelt, and which shall be adapted for retaining animals of an obnoxious character. A still further object is to provide a trap having a dual attraction to lure the animals to the proper location for springing the trap.

With the above-mentioned and other objects in view, the invention consists in an improved live-animal trap having a suitable cage or storage compartment and provided with means for attracting animals, and means for imprisoning such animals. The invention consists also further in the novel parts, combinations, and arrangements of parts as hereinafter more particularly described and further set forth in the accompanying claims.

Referring to the drawings,—Figure 1 is a perspective view of the new automatic repeating live-animal trap; Fig. 2 is a top plan of the complete trap; Fig. 3 is a transverse central sectional elevation of the complete trap; Fig. 4 is an enlarged fragmentary sectional view on the line IV—IV in Fig. 2; Fig. 5 is a longitudinal sectional elevation on the line V—V in Fig. 2; Fig. 6 is an enlarged fragmentary vertical section on the line VI—VI in Fig. 5; Fig. 7 is an enlarged fragmentary sectional view on the line VII—VII in Fig. 2; Fig. 8 is an enlarged sectional view of an operating spring motor on the line VIII—VIII in Fig. 2; and, Fig. 9 is a side elevation of the trap door of the machine having an improved latch and trip spring.

Similar reference characters in the different figures of the drawings indicate like parts or features of construction herein referred to in detail.

The improved trap as practically constructed, consists of a cage affording a storage compartment having a bottom or floor 1, sides 2 and 3, and ends 4 and 4'. The end 4' is provided with a head-board 5 extending higher than the aforementioned sides and ends and adapted to form a frame on which a mirror 6 is set. An eye 7 is secured to the upper portion of the head-board and supports a hook 8 on which to secure a bait 9.

A rotating trap door 10 is provided and centrally mounted, slightly below the top of the sides 2 and 3 on a shaft 11 that is rotatably supported in said sides, and having on one end thereof a crank 12 provided with a handle for winding or turning. On the outside of the side 2 and concentric with the shaft 11 a case or cover 13 is mounted in which a helical spring 14 is encased, one end of the spring having a securing pin 14' attached to the side 2 and the other end being secured to the shaft 11.

A retaining or locking pin 15 is provided and is removably inserted through the trap-door 10 and the shaft 11, the pin having a shoulder 16 for retaining it in position by means of a bar 17 pivotally secured to the door by a screw 18. By withdrawing the pin 15, the spring 14 can be wound about the shaft, and the inserted pin 15 binds the shaft 11 and the trap door 10 together as a single unit.

An improved latch and trip spring member is provided, having tapered arms 19 and 20 slightly bent outward from its center which is securely attached by screws or devices 10' to one side of the trap door 10 at an oblique angle, about the center of the shaft 11.

A trip plate 21 is provided and is centrally located toward one end of the trap door 10 and a similar trip plate 21' is located diametrically opposite to the trip plate 21 through the center of the shaft 11. These are connected at one end thereof to the door by means of pivot staples 22 and 22' to operate as levers and have lever arms 23 and 23' respectively at right angles to their faces, and are free to oscillate about the staples. The arms 19 and 20 of the improved latch and trip spring are connected with the arms 23 and 23' respectively by rods or wires 24 in such manner, that when they are in their normal position the plates 21 and 21' are inclined above the trap door 10 sufficiently to permit movement of the levers 23 and 23' to draw the outwardly bent arms 19 and 20 towards the trap door.

A stop pin bushing 25 is secured in the side 2, which is screw-threaded and adjustably receives a stop pin 26, being located at a suitable point to stop the trap door 10 in a horizontal position by means of the arms 19 and 20. The stop pin 26 has an end bar 27 which projects beyond the inner side of the side 2 into the path of movement of the arms 19 and 20 to successively stop the movement of the arms as they are carried by the door under the action of the spring motor.

A latch spring 28 is provided which has a base plate 29 securing it on one side of the head-board 5 in such a manner, that when the trap door 10 is released and rotates, it strikes against the spring 28 which acts as a brake and shock absorber. The trap door 10 rotates with sufficient force to pass slightly beyond the spring 28 which, assuming its normal shape engages and prevents the door from being reversed.

In practical use, the trap is first set or prepared by winding the spring 14. This is accomplished by moving the bar 17 away from the pin 15 and thus off the shoulder 16 which allows the pin 15 to be withdrawn. Holding the trap door 10 with one hand, the crank 12 is utilized to wind the spring 14 until it is fully wound, after which the pin 15 is returned and locked. The trap is then baited and placed in a favorable location, preferably in an excavation, with the trap door 10 approximately on a level with the adjacent ground or floor, or it may have brush or similar material heaped about to get the desired level. After the trap has been placed it requires no further attention until such time as the spring has entirely unwound. The continuity of its operation makes it highly efficient, obviating the necessity of a human odor in the vicinity, and probably frightening those animals who depend a great deal on scent to warn them of danger. In operation the animal is attracted by the odor of the bait and is further enticed by the appearance of its own likeness in the mirror 6, inducing it to go onto the trap door and spring the trap by a slight pressure on the trip plate 21 or 21'. This disengages the arm 19 or 20 from the pin end bar 27, allowing the trap door 10 to rotate and drop from beneath the animal, thus precipitating it suddenly into the cage or storage compartment, and preventing escape because of the return of the trap door by its motor to its normal position as a cover. The continuation of the trap door's rotation is arrested by the bar 27 obstructing the path of the latch and trip spring arms 19 and 20, thus setting the trap for further quarry. The trapped animals can be removed by a quarter rotation of the trap door which opens the top, or the trap can be immersed in a tank of water until the animals are drowned.

Having thus described the invention, what is claimed as new is:—

1. A live-animal trap comprising a cage with a head-board on one end thereof, a device on the head-board to support a bait, a shaft rotatable in the upper portion of the cage and having a crank device to rotate the shaft, a spring encircling the shaft and secured thereto and also to the cage, a trap door detachably secured at its middle portion to the shaft and normally closing the top of the cage, a stop device fixed on the inside of the cage, two laterally-movable spring-arms mounted on one side of the trap door on opposite sides respectively of the shaft radially to the shaft to alternately engage the stop device on rotation of the shaft, and two tripping devices mounted on opposite sides respectively of the trap door and adjacent to opposite ends respectively of the door and provided with cranks having pull-rods connected with the spring-arms respectively.

2. In a live-animal trap, the combination of a cage comprising a bottom and two sides and also two ends, one of the ends having a head-board on its top, a bait-holding device mounted on the head-board, a combined brake and reverse stop mounted on the head-board, an operating shaft rotatably mounted in the upper portions of said two sides midway between said ends and having a crank thereon outside of one of said sides, a trap door rotatively connected midway between the two opposite ends thereof to said shaft to swing and co-operate with said brake and reverse stop, a locking pin detachably connected to the trap door and the operating shaft, means to secure the locking pin in place, a spring motor mounted on the cage and co-operating with the operating shaft to rotate the shaft, two spring-arms mounted on the trap door on opposite sides respectively of the operating shaft, a stop bar adjustably mounted on one of said cage sides in the path of movement of the spring-arms, two trip plates pivotally mounted on opposite sides of the trap door adjacent to the opposite ends thereof respectively and having each a relatively angular arm thereon, and rods connected with the arms of the trip plates respectively and also with the spring-arms respectively.

In testimony whereof, I affix my signature in presence of two witnesses.

CHARLES CAIN.

Witnesses:
HARRY FRITTS,
FRANK McCLAFLIN.